(12) United States Patent
Li et al.

(10) Patent No.: US 11,584,077 B2
(45) Date of Patent: Feb. 21, 2023

(54) RESIN RESERVOIR FOR PHOTOCURING FOR USE IN 3D PRINTER AND 3D PRINTER

(71) Applicant: Gold Array Technology (Beijing), LLC, Beijing (CN)

(72) Inventors: Houmin Li, Beijing (CN); Xueyang Song, Beijing (CN); Shanding Ye, Beijing (CN); Yikun Wang, Beijing (CN); Kaiqiang Zhu, Beijing (CN); Beibei Xu, Beijing (CN)

(73) Assignee: GOLD ARRAY TECHNOLOGY (BEIJING), LLC, Beijing (CN)

( * ) Notice: Subject to any disclaimer, the term of this patent is extended or adjusted under 35 U.S.C. 154(b) by 0 days.

(21) Appl. No.: 17/329,911

(22) Filed: May 25, 2021

(65) Prior Publication Data

US 2021/0276256 A1    Sep. 9, 2021

Related U.S. Application Data

(62) Division of application No. 16/300,002, filed as application No. PCT/CN2017/088989 on Jun. 19, 2017, now abandoned.

(30) Foreign Application Priority Data

Jun. 23, 2016 (CN) .......................... 201610461679.3

(51) Int. Cl.
*B29C 64/255* (2017.01)
*B33Y 30/00* (2015.01)
*B29C 64/135* (2017.01)

(52) U.S. Cl.
CPC .......... *B29C 64/255* (2017.08); *B29C 64/135* (2017.08); *B33Y 30/00* (2014.12)

(58) Field of Classification Search
CPC ..... B29C 64/255; B29C 64/135; B29C 64/25; B29C 64/277; B29C 64/124; B33Y 30/00; B33Y 10/00
See application file for complete search history.

(56) References Cited

U.S. PATENT DOCUMENTS

| 2006/0161287 A1* | 7/2006 | Simonis ................ B29C 64/386 700/120 |
| 2014/0265034 A1* | 9/2014 | Dudley ................ B29C 64/106 264/401 |

FOREIGN PATENT DOCUMENTS

WO    WO-2014176704 A1 * 11/2014 ......... B29C 35/0805

* cited by examiner

*Primary Examiner* — Joseph S Del Sole
*Assistant Examiner* — Mohamed K Ahmed Ali
(74) *Attorney, Agent, or Firm* — Faegre Drinker Biddle & Reath LLP

(57) ABSTRACT

Provided are a resin reservoir (1) for photocuring for use in a 3D printer and a 3D printer using the resin reservoir (1). The resin reservoir (1) comprises: a reservoir body (11) for accommodating a liquid photosensitive resin, at least one side wall of the reservoir body (11) being an optically-transmissive wall (111); a transverse guide element (12) disposed at the reservoir body (11); and a load-bearing element (13) disposed inside the reservoir body (11) and capable of moving transversely along the guide element (12), wherein a load-bearing surface of the load-bearing element (13) faces the optically-transmissive wall (111). The resin reservoir (1) and the 3D printer enable a printed object to be transversely formed at the load-bearing element (13) and kept immersed in the liquid photosensitive resin, and a buoyancy provided by the liquid photosensitive resin can substantially offset the weight of the printed object. Therefore, structural strengths of the load-bearing element (13) and a transmission unit do not need to be reinforced, and the (Continued)

size of an object to be printed can be increased from 14 inches to 20-120 inches.

5 Claims, 2 Drawing Sheets

RESIN RESERVOIR FOR PHOTOCURING FOR USE IN 3D PRINTER AND 3D PRINTER

CROSS-REFERENCE TO RELATED APPLICATIONS

This application is a divisional of U.S. patent application Ser. No. 16/300,002, filed on Nov. 8, 2018, and entitled "RESIN RESERVOIR FOR PHOTOCURING FOR USE IN 3D PRINTER AND 3D PRINTER", which is a national phase of International Application No. PCT/CN2017/088989, filed on Jun. 19, 2017, and entitled "RESIN RESERVOIR FOR PHOTOCURING FOR USE IN 3D PRINTER AND 3D PRINTER", and claims priority from Chinese Patent Application No. 201610461679.3, filed on Jun. 23, 2016, the entire disclosures of which are incorporated herein by reference.

This application claims the priority to Chinese patent application No. 201610461679.3 titled "RESIN TANK APPLICABLE TO PHOTOCURING 3D PRINTER AND 3D PRINTER", filed with the Chinese State Intellectual Property Office on Jun. 23, 2016, which is incorporated herein by reference in its entirety.

FIELD

The present application relates to the field of 3D printers, specifically to a photosensitive resin tank and a 3D printer using the resin tank.

BACKGROUND

In current 3D printers, a resin tank and a load-bearing platform are formed separately. The liquid photosensitive resin tank is horizontally disposed inside the frame of the 3D printer, and the load-bearing platform can move vertically relative to the liquid photosensitive resin tank.

In the printing process, a virtual shape of an object to be printed is first formed by a computer, and the virtual shape is split into multiple thin layers, and each thin layer has a unique cross-sectional pattern. Then, the liquid photosensitive resin in the resin tank is irradiated with light, so that the liquid photosensitive resin is cured to a thin layer with the corresponding shape on the load-bearing platform according to the cross-sectional pattern. As the curing of each thin layer is completed, the load-bearing platform is raised by a certain distance, and then a subsequent thin layer is cured on a lower surface of the previous thin player, and thin layers are superposed layer by layer to form a complete printed object.

However, when the volume of the three-dimensional object to be printed increases, the load-bearing platform will be subjected to an excessive vertical load which may deform a bracket supporting or suspending the load-bearing platform. In this case, the load-bearing platform cannot maintain the absolute vertical movement, but will produce offset, thereby adversely affecting the forming precision of the three-dimensional object. Moreover, since the volume of the thin layers superposed layer by layer increases, it will accidently fall off the load-bearing platform due to the gravity. The operator has to stop printing, thereby obtaining an incomplete printed object.

In view of the above drawbacks, current common photocuring 3D printers may print the three-dimensional objects smaller than 254 mm×254 mm (about 14 inches), and can only be used for 3D printing of small objects.

SUMMARY

In view of the existing problems in the conventional art, a resin tank applicable to a photocuring 3D printer is provided according to the present application, which includes: a tank body for containing a liquid photosensitive resin, at least one side wall of the tank body being an optically-transmissive wall, a transverse guide element arranged on the tank body; and a load-bearing element arranged inside the tank body and movable transversely along the guide element, wherein a load-bearing surface of the load-bearing element faces the optically-transmissive wall.

In some embodiments of the present application, there are two of the guide elements which are respectively arranged at upper portions of sidewalls adjacent to the optically-transmissive wall.

In some embodiments of the present application, each of the guide elements is a guide screw, and an upper portion of the load-bearing element has a nut seat configured to cooperate with the guide screw.

The guide element can be disposed on the upper portion of the side wall of the resin tank to prevent the guide element from being failed due to the liquid photosensitive resin, especially when the guide element is embodied as a guide screw, if the guide element is stained with lots of liquid photosensitive resin, it may not be able to rotate. When the guide screw is adopted. the top of the load-bearing element has a nut seat configured to cooperate with the guide screw, so that the load-bearing element may be vertically hung in the interior of the resin tank, and the load-bearing element is capable of making transverse linear movement with the rotation of the guide screw.

In order to form larger objects on the load-bearing element, the size of the optically-transmissive wall of the resin tank described in the present application may be up to 20~120 inches, thereby printing the object with an interface size of 20 inches or even 120 inches.

In some embodiments of the present application, the resin tank further includes a LCD display unit, which has a same area as the optically-transmissive wall and is covered at an outer side or an inner side of the optically-transmissive wall.

In use, the liquid photosensitive resin may be irradiated by laser according to a certain path to allow the liquid photosensitive resin to be cured on the load-bearing element according to a certain shape. Furthermore, a DLP projection device can be utilized, to directly project the pattern onto the surface of the liquid photosensitive resin, to allow the liquid photosensitive resin to be cured into the same shape as the projected pattern. Moreover, an LCD display unit is covered at an outer side of the optically-transmissive wall, and the cross-sectional pattern of the object to be printed is displayed by the LCD display unit, the pattern is composed of a light-transmitting region and a light-shielding region, and then the LCD display unit is irradiated with light so that the liquid photosensitive resin in the resin tank is cured on the load-bearing element according to the pattern displayed by the LCD display unit.

In addition, a 3D printer using the above resin tank is further provided according to the present application.

In some embodiments of the present application, the 3D printer further includes a light source provided outside the optically-transmissive wall.

In some embodiments of the present application, when the LCD display unit is used, the light source of the photocuring 3D printer is arranged outside the optically-transmissive wall and the LCD display unit.

In some embodiments of the present application, the light source includes a light array with the same area as the optically-transmissive wall, and each light of the light array is able to be switched on or off independently.

Because the side wall of the resin tank or the LCD display unit provided in the present application has a larger area, if the size of the object to be cured does not reach the upper limit of 120 inches, then turning on the whole light array will result in waste of energy. In this embodiment, a rectangular LED light array with the same area as the side wall of the resin tank can be adopted, and the LED lights in a selected area can be turned on to irradiate the liquid photosensitive resin in the resin tank. This arrangement does not affect the formation of objects, and may save energy and reduce manufacturing cost.

In some embodiments of the present application, the photocuring 3D printer further incudes a control unit used to control the movement of the load-bearing element, the display pattern of the LCD display unit, and lights in the selected area of the light array to be switched on or off.

The light irradiates the liquid photosensitive resin in the tank body through the sidewall of the resin tank provided by the present application, to allow the printed object to be formed transversely on the load-bearing element, and the formed printed object is always immersed in the liquid photosensitive resin. Since the density difference between the cured printed object and the liquid photosensitive resin is very small, the buoyancy provided by the liquid photosensitive resin can substantially offset the weight of the printed object, so that the printed object is not apt to fall off the load-bearing element, and a shearing force applied by the printed object on the load-bearing element can be omitted. This arrangement does not need to increase the structural strength of the transmission unit associated with the load-bearing element, but also can increase the size of an object to be printed from 14 inches to 20~120 inches.

DETAILED DESCRIPTION

Figure 1:
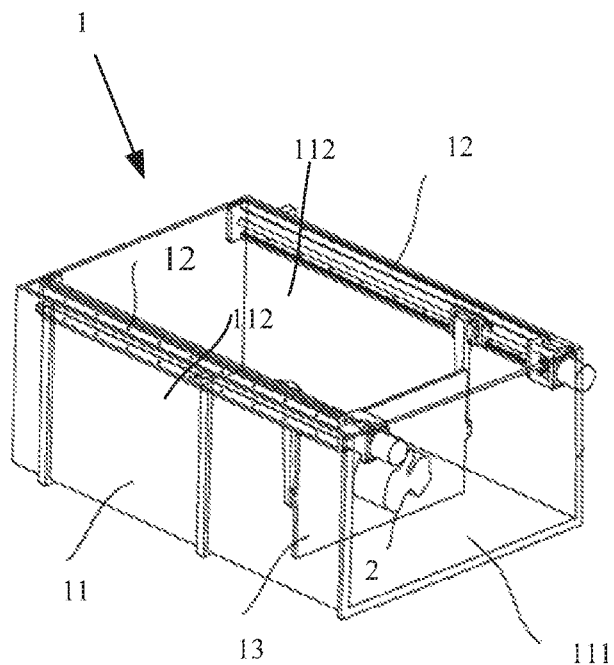
FIG. 1 is a schematic view of a resin tank according to an embodiment of the present application.

As shown in FIG. 1, a resin tank 1 applicable to a photocuring 3D printer is provided according to an embodiment of the present application, which includes a tank body 11 for containing a liquid photosensitive resin, a transverse guide element 12 arranged on the tank body 11, and a load-bearing element 13 arranged inside the tank body 11 and capable of moving transversely along the guide element 12. At least one side wall of the tank body 11 is an optically-transmissive wall 111, and a load-bearing surface of the load-bearing element 13 faces the optically-transmissive wall 111.

There may be two of the guide elements 12 which are respectively disposed at upper portions of the sidewalls 112 adjacent to the optically-transmissive wall 111. The guide element 12 may be embodied as a guide screw, and an upper portion of the load-bearing element 13 can be provided with a nut seat cooperating with the guide screw. Thus, when the guide screw rotates. the load-bearing element 13 can transversely move along the guide element 12 in the tank body 11, that is, the load-bearing element 13 can move towards or away from the optically-transmissive wall 111.

In an embodiment of the present application, the size of the optically-transmissive wall 111 can reach 20~120 inches, which is much larger than 14 inches.

In an embodiment of the present application, an LCD display unit 14 is further covered on an inner side of an outer side of the optically-transmissive wall 111 of the resin tank 1. The LCD display unit 14 has the same area as the area of the optically-transmissive wall. The LCD display unit 14 can be controlled by a control system to display the pattern of each cross section of an object to be printed.

As shown in FIG. 1, in use, a light source (not shown in Figures) irradiates the LCD display unit 14 to make the liquid photosensitive resin contained in the tank body 11 be cured on the load-bearing element 13. FIG. 1 shows an incomplete printed object 2 attached on the load-bearing element 13 and immersed in uncured liquid photosensitive resin.

Figure 2:
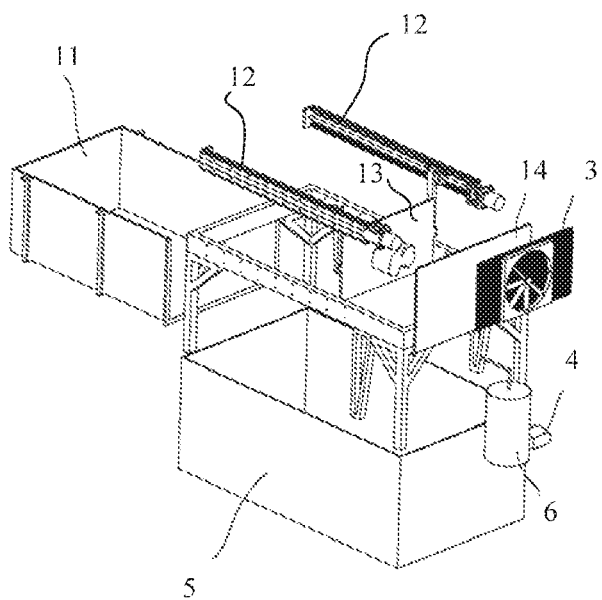
FIG. 2 is an exploded view of a photocuring 3D printer according to an embodiment of the present application.
Figure 3:
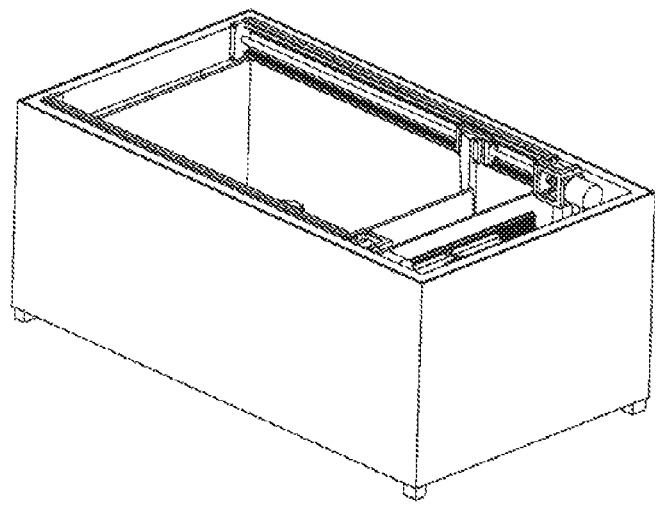
FIG. 3 is an assembly view of a photocuring 3D printer according to an embodiment of the present application.

As shown in FIG. 2 and FIG. 3, a photocuring 3D printer is further provided according to the present application, and includes the above resin tank 1 and a light source 3. When the above LCD display unit 14 is disposed at the outer side of the optically-transmissive wall 1, the light source 3 may be attached to the LCD display unit 14. The light source 3 first irradiates the LCD display unit 14, and then passes through the optically-transmissive wall 111 to irradiate the liquid photosensitive resin contained in the tank body 11, to make the liquid photosensitive resin be cured into the corresponding shape on the load-bearing element 13 according to the pattern displayed by the LCD display unit 14. In a case that the above LCD display unit 14 is disposed at the inner side of the optically-transmissive wall 111, the light source 3 may be attached on the optically-transmissive wall 111. The light source first passes through the optically-transmissive wall 111, and then irradiates the LCD display unit 14, to make the liquid photosensitive resin contained in the tank body 11 be cured into the corresponding shape on the load-bearing element 13 according to the pattern displayed by the LCD display unit 14.

Figure 4:
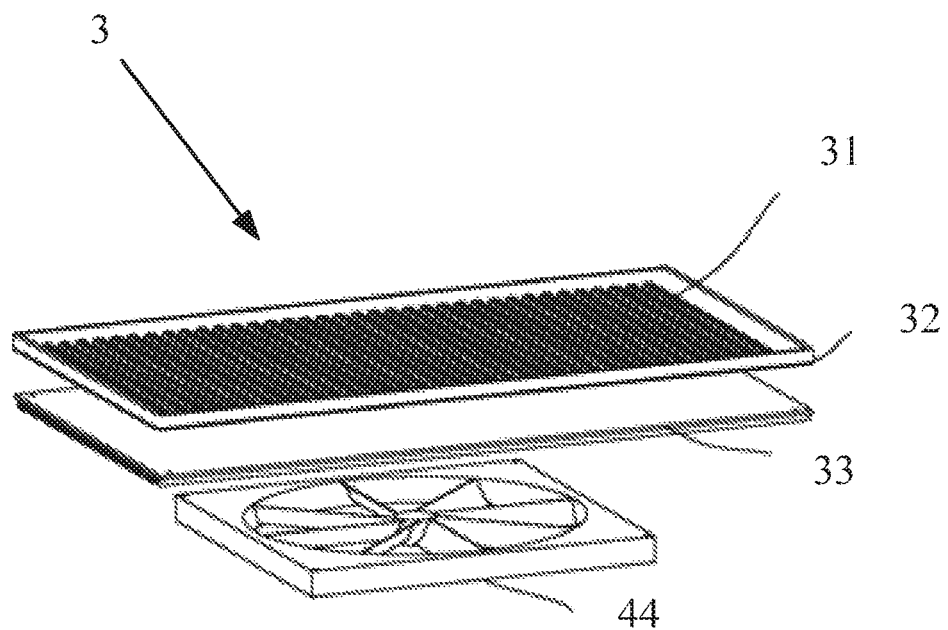
FIG. 4 is a schematic view showing the structure of a light source according to an embodiment of the present application.

Reference is made to FIG. 4, the light source 3 includes a LED light array 31 and a reflector 32 disposed around the LED light array 31. Since the optically-transmissive wall 111 of the tank body 1 and the LCD display unit 14 in the present application have a large size or an ultra large size of 20~120 inches, the area of the LED light array 31 should match this size. That is, when the optically-transmissive wall 111 reaches the maximum size of 120 inches, in general, the size of the LED light array 31 is no larger than 120 inches; in other words, the size of the LED light array is smaller than or equal to the size of the optically-transmissive wall 111. However, in the case that the photocuring 3D printer of the present application is used to print an object with a small size, it is not necessary to turn on all the LED lights of the LED light array 31, and only part of the LED lights are needed to be turned on to ensure the sufficient light intensity. Therefore, a control unit 4 may be utilized to set the number and the area of LED lights in the LED light array 31 to be turned on according to the virtual size of the object to be printed. Also, the control unit 14 may be further used to control the movement of the load-bearing element 13 and the displayed pattern of the LCD display unit 14.

In an embodiment of the present application, the light source 3 further includes a heat sink 33 arranged below the LED light array 31 and a fan 34 arranged below the heat sink 33 and used for blowing air toward the heat sink 33, thereby dissipating heat from the light source 3.

In an embodiment of the present application, the photocuring 3D printer further includes an outer frame 5. The resin tank 1, the light source 3, and the control unit 4 are all provided inside the outer frame 5. The resin tank 1 occupies most of the space in the outer frame 1.

In an embodiment of the present application, the above photocuring 3D printer further includes a supplying apparatus 6 for supplying liquid photosensitive resin. The supplying device 6 is in communication with the tank body 11 of the resin tank 1, and a detection end of the supplying device 6 is arranged in the tank body 11, and thus, the liquid photosensitive resin can be automatically replenished into the tank body 11 according to the storage amount of the photosensitive resin in the tank body 11, to ensure that the cured object on the load-bearing element 13 is always immersed in the liquid photosensitive resin.

When the photocuring 3D printer provided by the present application is in operation, the control unit 4 controls the LCD display unit 14 to form a cross-sectional pattern of the object to be printed with a light-transmitting region (transparent) and a light-shielding region (non-transparent), and then, controls the LED lights in a corresponding area in the LED light array 31 of the light source 3 to be turned on according to the size of the pattern. The light passes through the LCD display unit 14 and the optically-transmissive wall 111 to irradiate the liquid photosensitive resin in the tank body 11, to allow the liquid photosensitive resin to be cured into a corresponding thin layer on the load-bearing element 13. After completing the curing of one thin layer, the control unit 4 controls the LCD display unit 14 to switch to a next cross-sectional pattern of the object to be printed, and controls the load-bearing element 13 to move along the guide element 12 in the direction away from the optically-transmissive wall 111 by a distance equal to the thickness of a single thin layer. The control unit 4 again turns the light source 3 on to irradiate the liquid photosensitive resin in the tank body 11, to allow a post-cured thin layer to be accumulatively superposed on the previous thin layer. A completed printed object is formed by repeating the above procedure.

It can be seen that with the present application, the printed object is finally formed transversely on the load-bearing element 13 and is always immersed in the liquid photosensitive resin in the tank body 11. The buoyancy provided by the liquid photosensitive resin can substantially offset the weight of the printed object, so that the printed object is not apt to fall off the load-bearing element 13, and will not apply an excessive shearing force on the load-bearing element 13, thus avoiding the problem in the conventional art that the printing platform produces an offset in the vertical direction because the printed object is oversized. Therefore, compared with the conventional art, the size of the cross section of the printed object may obviously increase to 20~120 inches.

In view of this, the present application can be used to print an object with a larger cross-sectional size, such as 20~120 inches, apparently it also can print an object with a size equal to or smaller than 20 inches, like the conventional object of 14 inches.

The present application is not intended to limit the definition of the size of the resin tank, and referring to the above description, the size of the optically-transmissive wall of the resin tank 1 may actually select any size below 120 inches, including a size of 20~120 inches and a size equal to or smaller than 20 inches. On the other hand, since the buoyancy provided by the liquid photosensitive resin can substantially offset the weight of the printed object, the resin tank of the present application can adopt a longer dimension in the direction in which the transverse guide element extends, thereby enabling the 3D printer of the present application to print higher (or longer) objects.

Various embodiments of the present application have been described in detail hereinabove. Those skilled in the art should understand that various modifications, variations and changes may be made to the embodiments without departing from the scope of the present application (which is limited by the claims). The interpretation of the scope of the claims should be interpreted as a whole and in the broadest scope consistent with the description, and is not limited to the examples or the embodiments in the detailed description.

What is claimed is:

1. A photocuring 3D printer, comprising:
    a resin tank comprising:
        a tank body for containing a liquid photosensitive resin, one side wall of the tank body being an optically-transmissive wall;
        two transverse guide elements arranged on the tank body; and
        a load-bearing element arranged inside the tank body and movable transversely along the guide elements, wherein a load-bearing surface of the load-bearing element faces the optically-transmissive wall;
    a light source provided outside the optically-transmissive wall; and
    an LCD display unit having a same area as the optically-transmissive wall and covered at an outer side or an inner side of the optically-transmissive wall,
    wherein two of the guide elements are respectively arranged at upper portions of sidewalls adjacent to the optically-transmissive wall, each of the guide elements is a guide screw, and an upper portion of the load-bearing element has a nut seat configured to cooperate with the guide screw, and
    wherein a size of the optically-transmissive wall ranges from 20 inches to 120 inches.

2. The photocuring 3D printer according to claim 1, wherein the light source is a light array.

3. The photocuring 3D printer according to claim 2, wherein a size of the light array is no larger than 120 inches.

4. The photocuring 3D printer according to claim 2, further comprising a control unit configured to control lights in a selected area of the light array to be switched on or off.

5. The photocuring 3D printer according to claim 1, wherein the photocuring 3D printer further comprises a liquid photosensitive resin supplying device which is in communication with the tank body of the resin tank and is configured to supplement the liquid photosensitive resin into the tank body.

* * * * *